(12) United States Patent
Brown et al.

(10) Patent No.: US 7,631,979 B1
(45) Date of Patent: Dec. 15, 2009

(54) UNIVERSAL LIGHTING SYSTEM FOR COMPUTER WEB CAMERA

(76) Inventors: Richard D. Brown, 16735 Charmel La., Pacific Palisades, CA (US) 90272;
Michael R. Lohmann, 862 Hartzell St., Pacific Palisades, CA (US) 90272

(*) Notice: Subject to any disclaimer, the term of this patent is extended or adjusted under 35 U.S.C. 154(b) by 14 days.

(21) Appl. No.: 12/157,977

(22) Filed: Jun. 14, 2008

(51) Int. Cl.
*G03B 15/02* (2006.01)

(52) U.S. Cl. .................. 362/3; 362/8; 362/11; 362/16

(58) Field of Classification Search .............. 362/3, 362/11, 16, 17, 18
See application file for complete search history.

(56) References Cited

U.S. PATENT DOCUMENTS

| | | | |
|---|---|---|---|
| 4,258,387 A | 3/1981 | Lemelson et al. | |
| 5,010,412 A | 4/1991 | Garriss | |
| 5,379,201 A | 1/1995 | Friedman | |
| 5,475,441 A | 12/1995 | Parulski et al. | |
| 5,684,530 A | 11/1997 | White | |
| 6,273,581 B1* | 8/2001 | Neiser | 362/109 |
| 6,344,874 B1 | 2/2002 | Helms et al. | |
| D455,855 S | 4/2002 | Emerson, Jr. et al. | |
| 6,435,692 B1* | 8/2002 | Naghi et al. | 362/109 |
| 6,646,672 B2 | 11/2003 | Feierbach | |
| 6,877,878 B2 | 4/2005 | Raskas | |
| 6,979,093 B2 | 12/2005 | Tsay | |
| 7,225,414 B1 | 5/2007 | Sharma et al. | |
| 2003/0227770 A1 | 12/2003 | Chen et al. | |
| 2004/0140459 A1 | 7/2004 | Haigh et al. | |
| 2004/0218089 A1* | 11/2004 | Heusinkveld | 348/370 |
| 2005/0151042 A1* | 7/2005 | Watson | 248/226.11 |
| 2005/0207170 A1 | 9/2005 | Opolka | |
| 2006/0095297 A1 | 5/2006 | Virik | |
| 2006/0181862 A1 | 8/2006 | Pohlert et al. | |
| 2007/0081094 A1 | 4/2007 | Ciudad et al. | |
| 2007/0103918 A1 | 5/2007 | Lin | |
| 2007/0138360 A1 | 6/2007 | Martin et al. | |

* cited by examiner

*Primary Examiner*—Hargobind S Sawhney
(74) *Attorney, Agent, or Firm*—John S. Christopher

(57) ABSTRACT

A universal lighting system for use with a computer web camera including a digital computing device fitted with a web camera for capturing images of a subject for transmission over a worldwide communication network. A base clamping mechanism is affixed to the computing device. A light array is adjustably connected to the base clamping mechanism for illuminating the subject positioned before the web camera. A diffuser lens is flexibly connected to the base clamping mechanism and sealingly positioned over the web camera for diffusing received light for creating a clear image of the illuminated subject prior to transmission over the communication network.

15 Claims, 4 Drawing Sheets

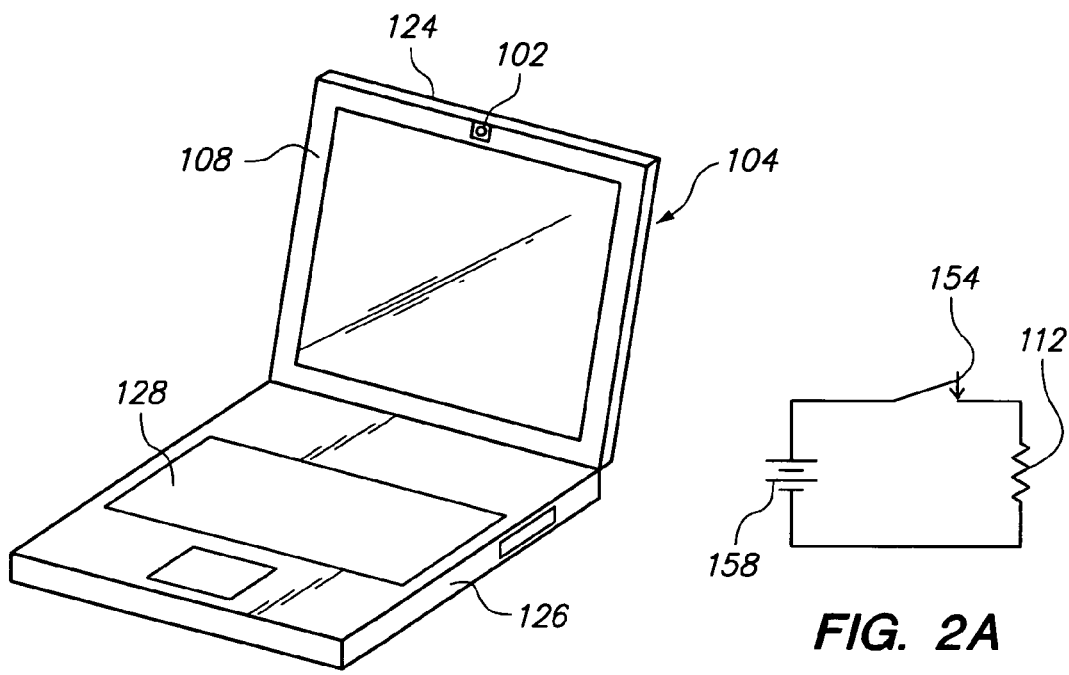
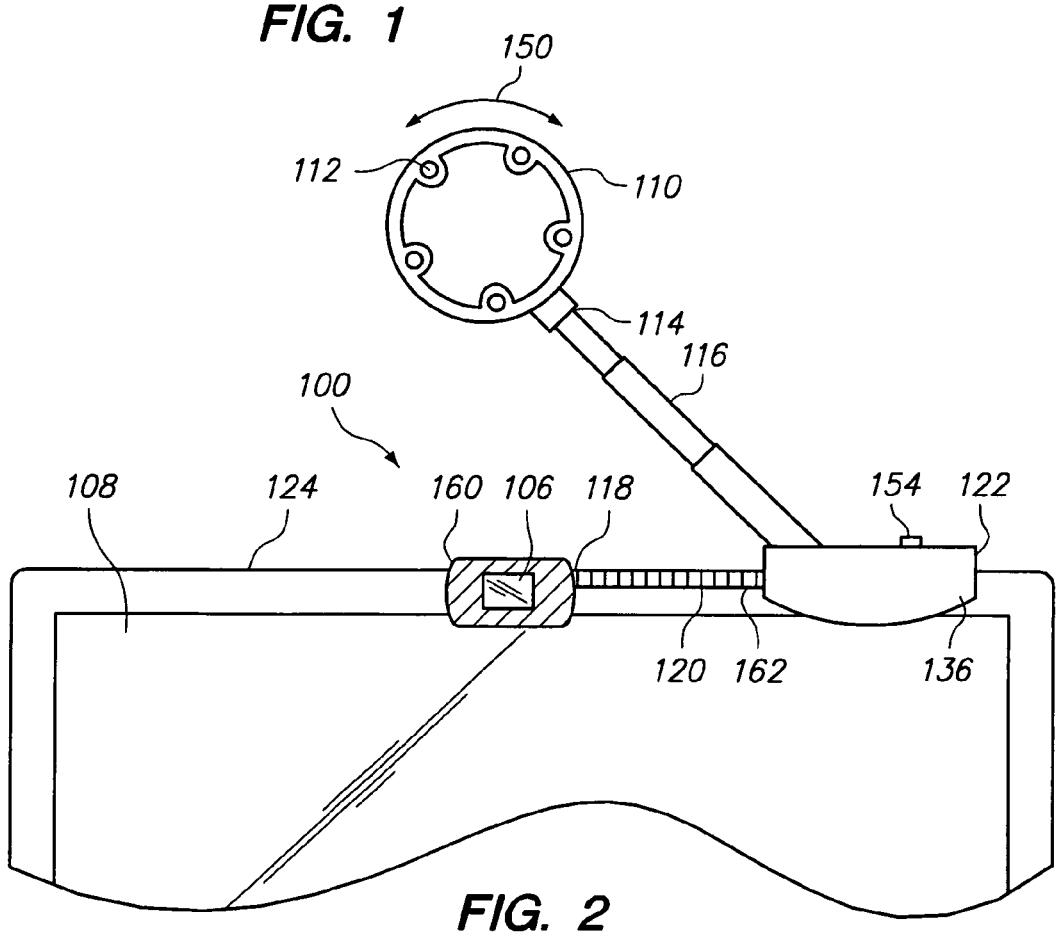

UNIVERSAL LIGHTING SYSTEM FOR COMPUTER WEB CAMERA

BACKGROUND OF THE INVENTION

1. Technical Field

The present invention relates to a lighting system for computer web cameras. More specifically, the present invention relates to methods and apparatus for a universal lighting system in combination with a light diffuser lens for use with a flat screen monitor fitted with a web camera for enhancing and clarifying, while reducing distortion flaws, of an image of a computer subject generated by the web camera for transmission over a worldwide communication network.

2. Background Art

Laptop computers and desk top computers for use on the networking infrastructure known as the Internet can include a web camera for capturing and transmitting the visual image of the person operating the computer over the network. These computer camera systems (typically referred to as web cam systems) for use over the Internet network are popular particularly when utilized by social dating networks where a transmitted visual depiction of the person is important. The transmitted visual image of a person communicating over the Internet with other persons (not previously introduced) is likely to determine whether a subsequent in-person introduction will ever occur. Consequently, the quality of the images transmitted over the Internet is very important and can only be accomplished by an accurate representation of the person transmitting the image.

Often, the image transmitted from the web camera to a receiving laptop computer or desktop computer is a poor representative image of the person on the transmitting end. Facial flaws and/or contour flaws may be accentuated and projected in the transmitted visual image. Unfortunately, blatant inaccuracies of the subject person may result in an unfavorable image at the receiving computer. This situation may result in unsuccessful attempts at utilizing the social network.

State of the art laptop computers and desktop computers may include either (1) an integrated web camera that is incorporated into the flat screen monitor design, or (2) a stand-alone aftermarket web camera that is physically attached to the top edge of the computer flat screen monitor. Generally, the ambient light level available in the room or space where the laptop computer or desktop computer is utilized is inadequate to transmit a clear image of the computer operator over the Internet. In particular, the primary cause of these visual image transmission problems in the prior art laptop computers and desktop computers that are fitted with web cameras is attributable to inadequate, insufficient or non-existent lighting and/or non-diffusion of the available light. Consequently, the visual image transmitted is of poor quality.

Thus, there is a need in the art for a universal lighting system for use with a computer web camera having a light array comprised of a plurality of efficient, long lasting Light Emitting Diodes (LED) positioned on the distal end of an adjustable telescopic arm for increasing the ambient light level about the computer subject, a light diffuser lens positioned on the distal end of a flexible arm for evenly diffusing the received image light prior to being transmitted over a worldwide communication network such as the Internet via the web camera, and a base clamping mechanism for attaching the universal lighting system to the top edge of the flat screen monitor of either a laptop computer or a conventional desktop computer whether the web camera is an integrated type or a stand-alone, after-market type.

DISCLOSURE OF THE INVENTION

Briefly, and in general terms, the present invention provides a new and improved universal lighting system for use with a computer web camera typically associated with a digital computing device such as a laptop computer or a desktop computer. The computer web camera can be integrated into a monitor screen of the laptop computer, or can be an aftermarket, stand-alone apparatus mechanically attached to the monitor screen of the desktop computer. The function of the web camera is to capture the image of a computer operator, that is, the subject, for transmission over a worldwide communications network such as the Internet.

In a preferred embodiment, the universal lighting system for use with a computer web camera comprises at least three main structural components. These structural components include a base clamping mechanism for attaching the universal lighting system to a flat screen monitor of the digital computing device, a light array adjustably connected to the base clamping mechanism for illuminating the subject positioned in front of the computer web camera, and a light diffuser lens flexibly connected to the base clamping mechanism and positioned over the web camera for evenly diffusing the light received from the illuminated subject for ensuring the creation of a clear image of the subject. The clear image of the subject is then transmitted over the worldwide communication network to an intended destination. Thus, the universal lighting system of the present invention addresses and solves the problem of inadequate lighting resulting in poor quality and/or distorted images originating at the transmitting computing device.

The base clamping mechanism serves as the main attachment component for affixing the universal lighting system of the present invention to the flat screen monitor of the digital computing device. The base clamping mechanism comprises a clamping jaw including a front lip that fits directly over the top edge of the flat screen monitor. An adjustable clamp wheel having a knurled handle and a threaded shaft is used to physically tighten the clamping jaw onto the flat screen monitor. Affixed to the base clamping mechanism is a tension swivel joint to which a telescopic arm is connected. The telescopic arm includes the light array affixed to a first distal end thereof. A battery compartment and a push-button light switch are also included in the base clamping mechanism for energizing and controlling the electrical power distributed to the light array. Also attached to the base clamping mechanism via a flexible arm is the light diffuser lens.

The light array functions to illuminate the subject positioned in front of the web camera so as to provide adequate lighting to enable the digital web camera to create a clear and undistorted image of the subject for transmission over the worldwide communication network. The light array is fashioned in the form of a ring-shaped lamp having a plurality of light emitting diodes (LEDs) for generating the illumination. The light emitting diodes (LEDs) are employed because of their high efficiency and efficacy in lighting circuits. The ring-shaped light array is located at the end of the adjustable telescopic arm which, in turn, is connected to the tension swivel joint affixed to the rear side of the base clamping mechanism. Consequently, the ring-shaped light array is adjustable through a complete range of motion since the telescopic arm provides an adjustable radius and the tension swivel joint provides movement throughout the complete 360 degree range of angles. The electrical wiring that carries the electrical power to the light emitting diodes fitted within the light array is circuited through the telescopic arm, the light switch and ultimately to the battery power supply.

The light diffuser lens functions to diffuse light received from the illuminated subject positioned in front of the web camera. The received light is passed through the diffuser lens that is positioned over the web camera associated with the flat screen monitor. The use of the diffuser lens results in an even redistribution of the received light rays to reduce the distortion of the image often associated with web cameras, and to enable the web camera to create a clear image of the illuminated subject prior to transmission of the image over the communication network. The diffuser lens is surrounded by a light seal comprised of a suitable material such as, for example, rubberized neoprene. The light seal formed about the diffuser lens serves to block the entry of stray light into the web camera thereby further reducing potential distortion of the subject image. The light diffuser lens is mounted on the end of the flexible arm which enables the diffuser lens to be manually positioned over the web camera notwithstanding whether the web camera is integrated into the flat screen monitor or is an aftermarket, stand-alone web camera attached to the flat screen monitor. The flexible arm is then physically attached to the base clamping mechanism.

The present invention is generally directed to a universal lighting system for use with a computer web camera including a digital computing device fitted with a web camera for capturing images of a subject for transmission over a worldwide communication network. A base clamping mechanism is affixed to the computing device. A light array is adjustably connected to the base clamping mechanism for illuminating the subject positioned before the web camera. A diffuser lens is flexibly connected to the base clamping mechanism and sealingly positioned over the web camera for diffusing received light for creating a clear image of the illuminated subject prior to transmission over the communication network.

These and other objects and advantages of the present invention will become apparent from the following more detailed description, taken in conjunction with the accompanying drawings which illustrate the invention, by way of example.

BRIEF DESCRIPTION OF THE DRAWINGS

FIG. 1 is a perspective view of a laptop computer having a flat screen monitor incorporating an integral web camera at the top of the flat screen monitor.

FIG. 2 is a front elevation view of a universal lighting system for use with a computer web camera showing a base clamping mechanism, a light array located at the end of a telescopic arm, and a light diffuser lens located over the integral web camera shown in FIG. 1.

FIG. 2A is a simple electrical schematic diagram of the universal lighting system for use with a computer web camera illustrating a battery represented by a direct current source, a light switch, and the light array represented by an electrical resistance.

DETAILED DESCRIPTION OF THE INVENTION

Figure 3:
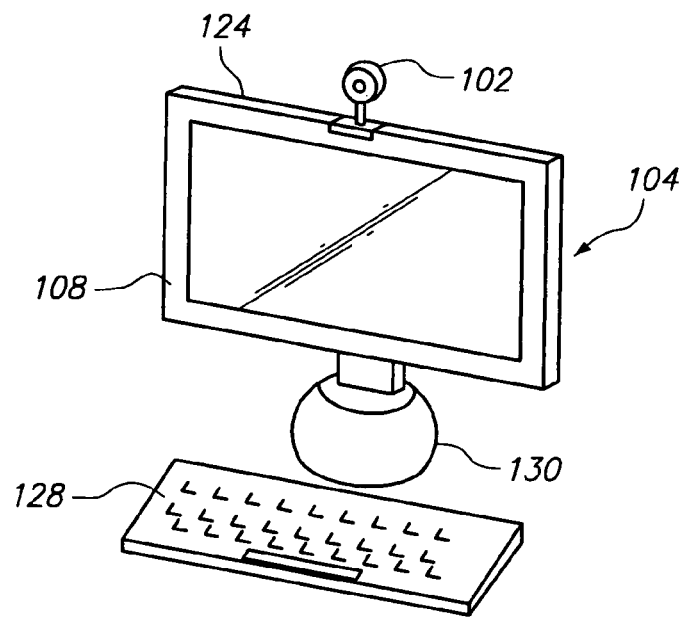
FIG. 3 is a perspective view of a desktop computer having a flat screen monitor including an after-market, stand-alone web camera mounted at the top of the flat screen monitor.

The present invention relates to a universal lighting system 100 as shown in FIGS. 1-8 for use with a computer web camera 102 associated with a digital computing device 104, the universal lighting system 100 including a light diffuser lens 106 for use with a flat screen monitor 108 of the digital computing device 104. The flat screen monitor 108 is fitted with the web camera 102 for enhancing and clarifying while reducing distortion flaws of an image of a computer subject (not shown) generated by the web camera 102 for transmission over a worldwide communication network such as the Internet (not shown).

In a preferred embodiment, the present invention is directed to the universal lighting system 100 for use with the computer web camera 102, the lighting system 100 comprised of three main structural components including (1) a light array 110 comprised of a plurality of efficient, long lasting Light Emitting Diodes (LEDs) 112 attached to a first distal end 114 of an adjustable telescopic arm 116 for increasing the ambient light level about the computer subject (not shown). The (2) light diffuser lens 106 is flexibly connected to a second distal end 118 of a flexible arm 120 for evenly diffusing the reflected image light received by the web camera 102 prior to being transmitted over the worldwide communication network. Finally, (3) a base clamping mechanism 122 is provided for adjustably connecting and securing the light diffuser lens 106 and the light array 110 of the universal lighting system 100 to a top edge 124 of the flat screen monitor 108 of the digital computing device 104. It is noted that the digital computing device 104 can be either a laptop computer as shown in FIG. 1 or a conventional desktop computer as shown in FIG. 3. Likewise, the computer web camera 102 can be integrated into the flat screen monitor 108 as shown in FIG. 1, or the web camera 102 can be a stand-alone, after-market type physically attached to the top edge 124 of the flat screen monitor 108 as shown in FIG. 3.

The Internet is a massive network of networks, that is a networking infrastructure that is pervasive worldwide. The Internet connects millions of computers together globally forming a network in which any computer can communicate with any other computer as long as they are both connected to the Internet. Consequently, members of social networks that communicate over a worldwide communication network such as the Internet must have use of a digital computing device 104 that is compatible with the Internet. Digital computing devices 104 are available in both portable and non-portable configurations. Therefore, the universal lighting system 100 of the present invention for use with the computer web camera 102 has been adapted for use with digital computing devices 104 of both the laptop computer and the desktop computer configurations. In either case, the computer web camera 102 functions to capture the image of the computer subject (typically the computer operator) for transmission over the worldwide communication network such as the Internet.

An illustration of the laptop type of digital computing device 104 is shown in FIG. 1 and includes a computer casing 126 upon which a keyboard 128 is mounted. Moveably hinged to the computer casing 126 is a flat screen monitor 108 having a computer web camera 102 integrally formed therein. Likewise, an illustration of the desktop type of digital computing device 104 is shown in FIG. 3 and includes the aftermarket, stand-alone computer web camera 102 physically mounted upon the top edge 124 of the flat screen monitor 108. The flat screen monitor 108 is supported by a support stand 130 and a separate keyboard 128 is shown positioned in front of the flat screen monitor 108. It is noted that the universal lighting system 100 for use with the computer web camera 102 is also adaptable to other configurations of the digital computing devices 104 not illustrated herein. Those alternative configurations of the digital computing devices 104 might include but are not limited to a laptop computer fitted with an aftermarket, stand-alone computer web camera 102 or, in the alternative, a desktop computer fitted with an integral web camera 102.

Figure 4:
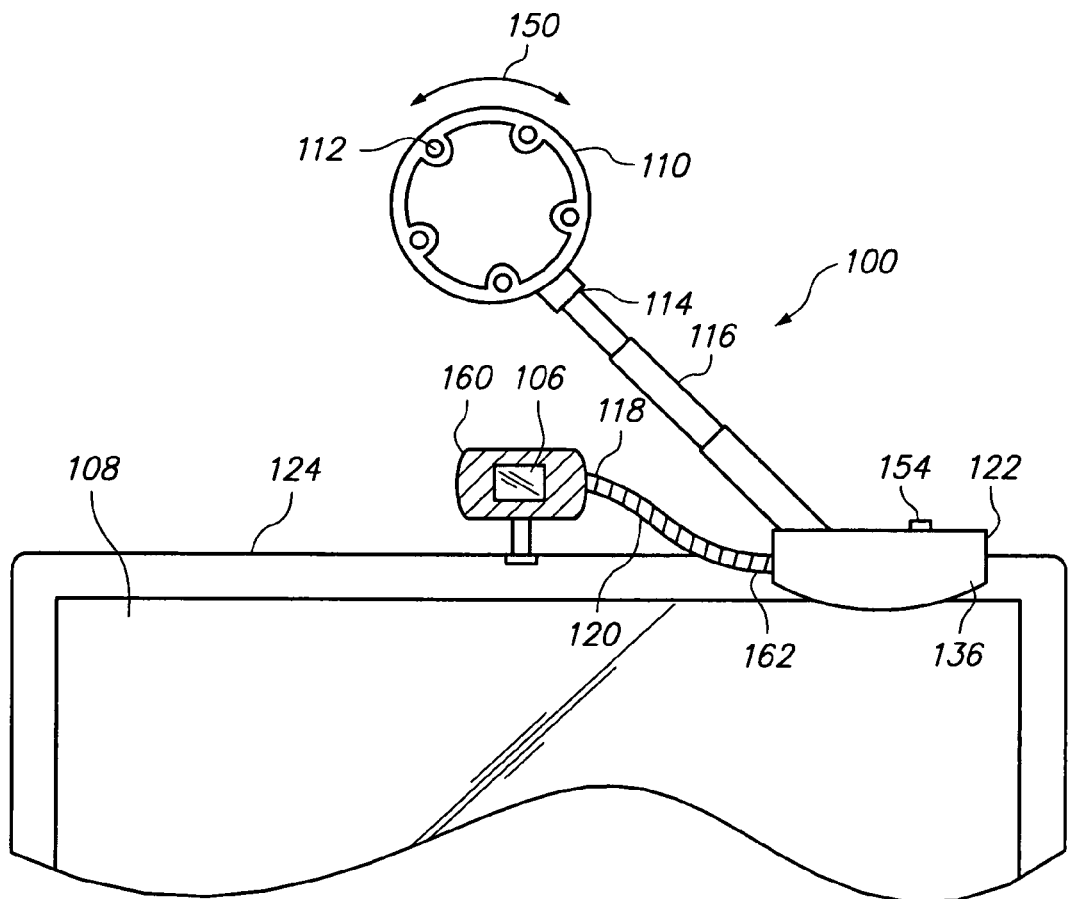
FIG. 4 is a front elevation view of the universal lighting system for use with a computer web camera showing the base clamping mechanism, the light array located at the end of the telescopic arm, and the light diffuser lens adjusted for covering the after-market, stand-alone web camera shown in FIG. 3.
Figure 5:
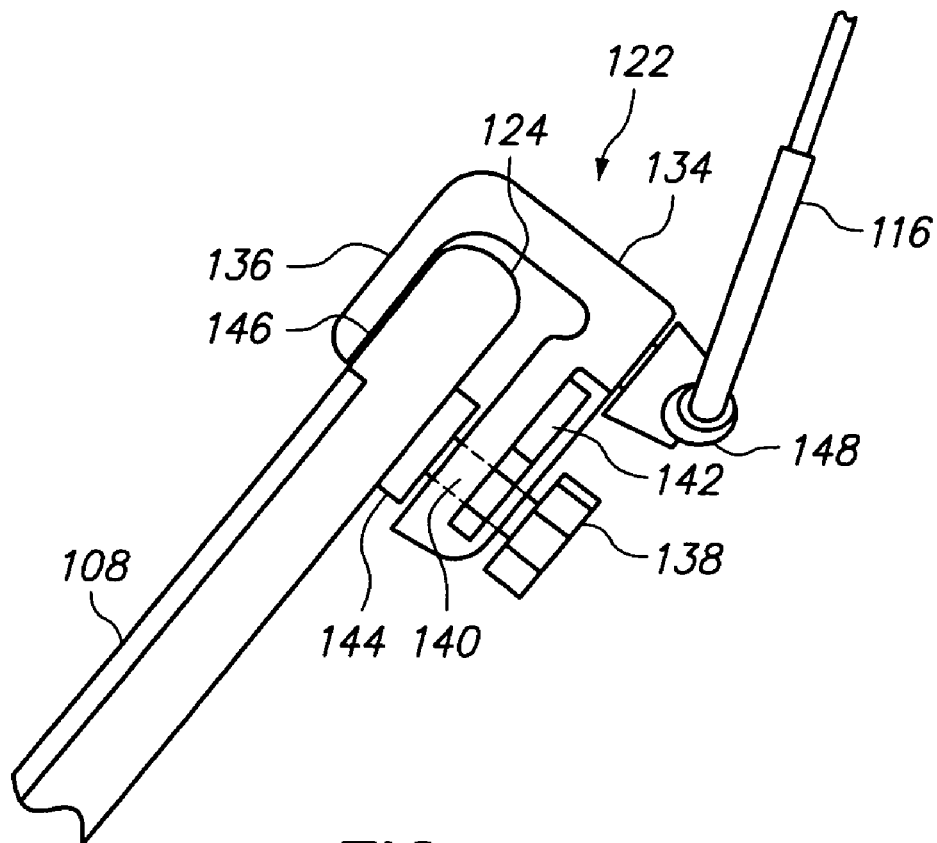
FIG. 5 is a partial side elevation view of the universal lighting system for the computer web camera of FIGS. 2 and 4 showing the base clamping mechanism attached to the top edge of the flat screen monitor by employing an adjustable clamp wheel.
Figure 6:
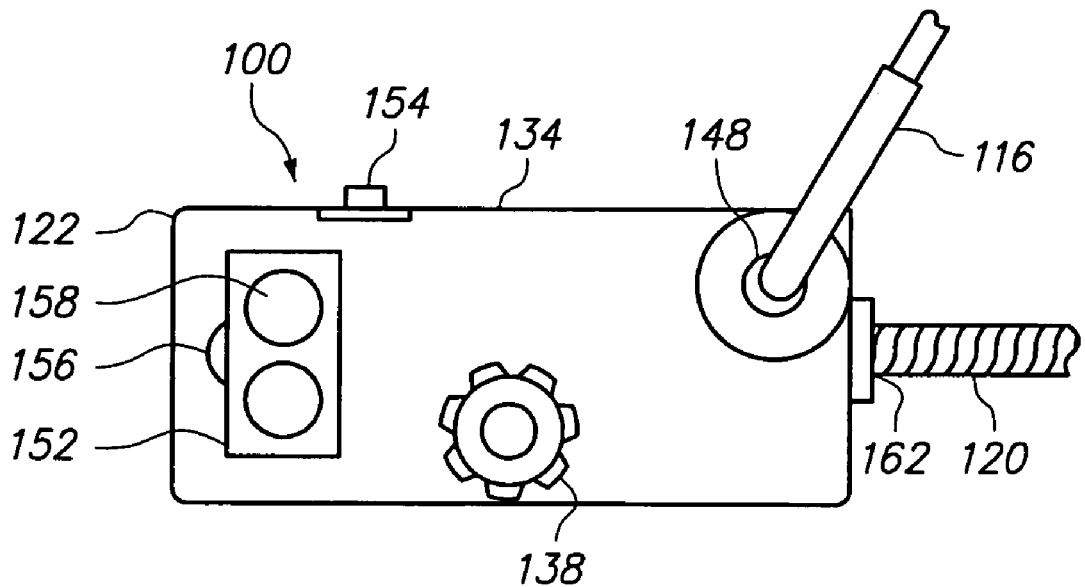
FIG. 6 is a partial rear elevation view of the universal lighting system for the computer web camera of FIGS. 2 and 4 showing the rear side of the base clamping mechanism when attached to the top edge of the flat screen monitor including a battery access compartment and a light switch.

The base clamping mechanism 122 functions as the main attachment component for securing the universal lighting system 100 of the present invention to the top edge 124 of the flat screen monitor 108 of the digital computing device 104. The base clamping mechanism 122 comprises a clamping jaw 134 including a front lip 136 that seats directly over the top edge 124 of the flat screen monitor 108 best shown in FIG. 5. A view of the front lip 136 of the base clamping mechanism 122 seated on the top edge 124 of the flat screen monitor 108 is also shown in FIGS. 2 and 4. The clamping jaw 134 is tightened against the top edge 124 of the flat screen monitor 108 by employing an adjustable clamp wheel 138 having a knurled handle for manually advancing and retracting a threaded shaft 140. The threaded shaft 140 is supported by a clamp structure 142 of the clamping jaw 134 as shown in FIG. 5. By turning the adjustable clamp wheel 138 by the knurled handle in the appropriate direction, the threaded shaft 140 is advanced through the clamp structure 142 and against a rubber foot 144. The rubber foot 144 is positioned between a terminal end of the threaded shaft 140 and the rear side of the flat screen monitor 108. Furthermore, positioned between the front lip 136 of the clamping jaw 134 and the front side of the flat screen monitor 108 is a felt pad 146. Both the rubber foot 144 and the felt pad 146 serve to protect the surface of the flat screen monitor 108 from damage potentially caused by the clamping jaw 134 of the base clamping mechanism 122.

Also affixed to the backside of the base clamping mechanism 122 is a tension swivel joint 148 to which the adjustable telescopic arm 116 is moveably connected. The tension swivel joint 148 provides a broad adjustable range of rotational motion for the telescopic arm 116. The range of motion enjoyed by the telescopic arm 116 as a result of the tension swivel joint 148 is potentially up to 360-degrees but more likely an arc of 180-degrees (Pi radians). This range of motion can be defined by the angular arc 150 that the adjustable telescopic arm 116 would travel from the left side of the top edge 124 to the right side of the top edge 124 of the flat screen monitor 108 as shown in FIGS. 2 and 4. Likewise, the telescopic arm 116 could conceivably also be adjusted either forward or backwards at the tension swivel joint 148, e.g., the telescopic arm 116 being adjusted either into the plane of the paper or out of the plane of the paper as viewed in FIGS. 2 and 4. This very liberal arc range of motion combined with the translational motion provided by the extension and contraction of the telescopic arm 116 enables the light array 110 to be positioned at almost any required location to illuminate the computer subject located before the computer web camera 102. Consequently, the tension swivel joint 148 enjoys three degrees of freedom since it can be adjusted (1) back and forth, (2) side-to-side, and (3) along the translational path.

Also formed on the backside of the base clamping mechanism 122 is a battery compartment 152 and a light switch 154. The battery compartment 152 includes an access door 156 for housing a plurality of low voltage (direct current) batteries 158 for providing the electrical power necessary to energize the light array 110 mounted on the first distal end 114 of the telescopic arm 116. The batteries 158 can be, for example, of the nickel-cadmium variety. Electrical wires (not shown) employed to carry the electrical current from the batteries 158 to the light array 110 are circuited from the batteries 158, through the light switch 154 and on to the light array 110 via the telescopic arm 116. The light switch 154 can be an industry standard spring-loaded (push button) device employed to carry rated current drawn from the battery 158 through the light emitting diodes (LEDs) 112 of the light array 110 as shown in FIG. 2A. In FIG. 2A, the light emitting diodes (LEDs) 112 are shown as an electrical load, i.e., a resistor. Thus, the combination of the batteries 158 and the light switch 154 included within the base clamping mechanism 122 serve to energize and control the electrical power distributed to the light array 110. Finally, the flexible bendable arm 120 is connected to the base clamping mechanism 122 for supporting the light diffuser lens 106. The light diffuser lens 106 is flexibly connected to the second distal end 118 of the flexible arm 120 as is clearly shown in FIG. 8. The light diffuser lens 106 serves to evenly diffuse the reflected image light received by the web camera 102 from the computer subject (not shown) prior to being transmitted over the worldwide communication network.

Figure 7:
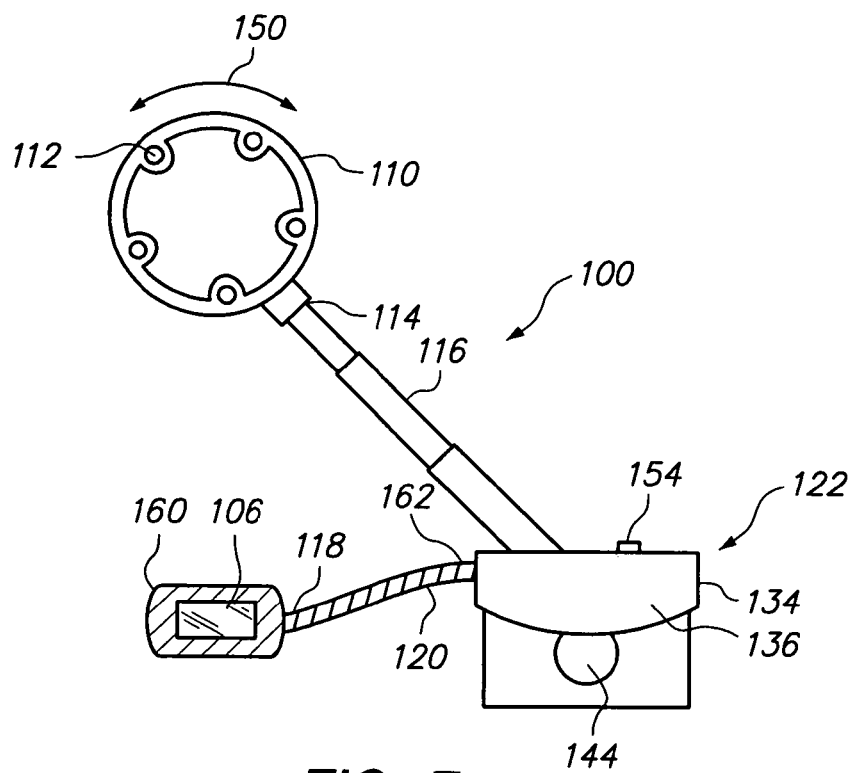
FIG. 7 is a front elevation view of the universal lighting system for the computer web camera of FIGS. 2 and 4 when removed from the flat screen monitor, showing the base clamping mechanism, the light array located at the end of the telescopic arm, and the light diffuser lens mounted on the end of a flexible arm.
Figure 8:
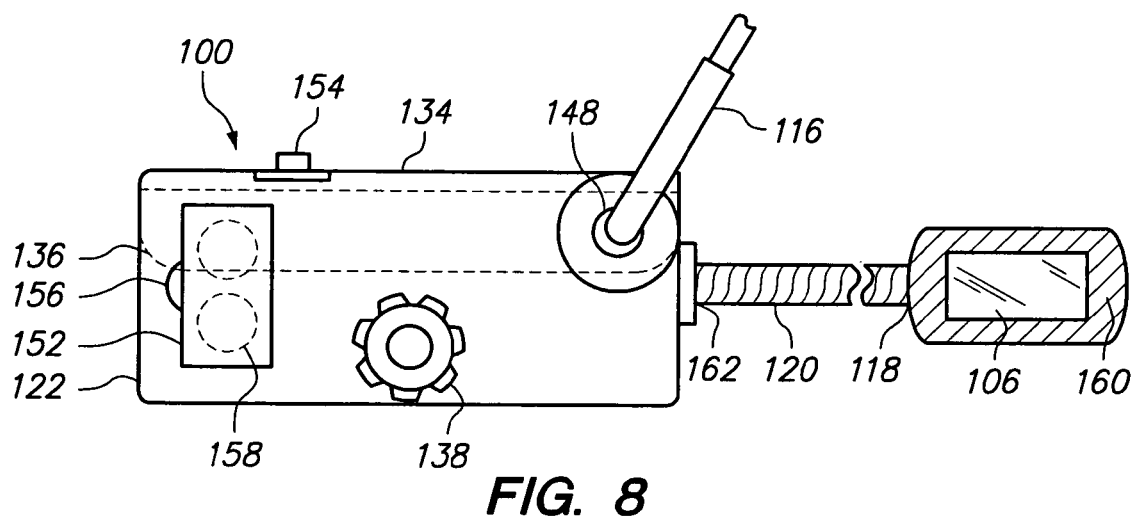
FIG. 8 is a rear elevation view of the universal lighting system for the computer web camera of FIGS. 2 and 4 when removed from the flat screen monitor, showing the base clamping mechanism, telescopic arm, and the light diffuser lens mounted at the end of the flexible arm including a rubberized neoprene light seal.

The light array 110 is adjustably connected to the base clamping mechanism 122 via the adjustable telescopic arm 116 for illuminating the subject (not shown) positioned in front of the computer web camera 102 best shown in FIGS. 2, 4 and 7. By illuminating the subject positioned before the computer web camera 102, the light array 110 functions to provide adequate lighting to enable the digital computer web camera 102 to create a clear and undistorted image of the subject for transmission over the worldwide communication network. The light array 110 is fashioned in the form of a ring-shaped lamp sometimes referred to as ring lighting. The ring lighting provides the advantage of a better distribution of light rays onto the computer subject (typically the computer operator) to avoid creating shadows. The ring-shaped lamp of the light array 110 is typically fabricated as a plastic loop which incorporates the plurality of light emitting diodes (LEDs) 112 for generating the illumination. The light emitting diodes 112 are employed as the light generating source in the light array 110 because of their high efficiency and efficacy in lighting circuits.

The ring-shaped light array 110 is positioned at the first distal end 114 of the telescopic arm 116, the length of which is manually adjustable due to the telescopic construction. The telescopic arm 116 typically will include a telescopic extension of 4"-to-8" of travel. The telescopic arm 116 is physically connected to the tension swivel joint 148 mounted to the rear side of the base clamping mechanism 122. The tension swivel joint 148 provides a broad range of adjustable rotational motion having three degrees of freedom. The rotational range of motion provided by the tension swivel joint 148 enables the telescopic arm 116 to easily travel across broad arcs of 180-degrees (Pi radians) or more. This range of motion easily enables the light array 110 to span the entire length of the top edge 124 of the flat screen monitor 108 as is indicated by the angular arc 150 shown in FIGS. 2 and 4. This rotational range of motion provided by the tension swivel joint 148 combined with the telescopic extension and contraction of the telescopic arm 116 enables the light array 110 to be positioned at almost any required location to illuminate the computer subject located before the computer web camera 102. Consequently, the ring-shaped lamp comprising the light array 110 is adjustable through a complete range of motion because the telescopic arm 116 provides an adjustable radius and the tension swivel joint 148 provides broad rotational movement.

The light emitting diodes 112 mounted on the ring-shaped light array 110 must be energized by the low voltage direct current power provided by the power supply, e.g., the batteries 158, located within the battery compartment 152. The required electrical power travels over the electrical wiring (not shown) that is circuited from the batteries 158 through the push-button light switch 154 and into the adjustable telescopic arm 116. The telescopic arm 116 serves as a conduit to carry the electrical wiring to the light emitting diodes 112 of the light array 110. The light emitting diodes 112 would typically be wired in a parallel configuration and would be energized to glow for producing light once the light switch 154 has been actuated.

The light diffuser lens 106 shown clearly in Applicant's FIGS. 2, 4, 7 and 8 functions to diffuse light received from the illuminated subject (not shown) positioned in front of the computer web camera 102. The received light is passed through the light diffuser lens 106 that is positioned to cover the computer web camera 102 associated with the flat screen monitor 108. The use of the light diffuser lens 106 results in an even redistribution of the received light rays to reduce the distortion of the image often associated with the computer web camera 102. Further, the light diffuser lens 106 enables the web camera 102 to create a clear image of the illuminated subject (not shown) prior to transmission of the image over the worldwide communication network.

The light diffuser lens 106 is surrounded by a light seal 160 comprised of a suitable material such as, for example, rubberized neoprene. However, it is understood that any suitable material whether natural or synthetic can be employed for use as the light seal 160. The light seal 160 formed about the light diffuser lens 106 serves to block admission of stray light into the computer web camera 102 that would otherwise serve to interfere with the operation of the light diffuser lens 106 mounted over the web camera 106. This action is accomplished in the following manner. The material comprising the light seal 160 adheres to the front surface of the computer web camera 102 or to the flat screen monitor 108 depending upon which configuration of the computer web camera 102 is being utilized (i.e., aftermarket stand-alone computer web camera or integrated computer web camera). Consequently, the light seal 160 further reduces potential distortion of the subject image prior to transmission over the worldwide communication network. In other words, the image generated by the computer web camera 102 is enhanced and clarified prior to being transmitted to the recipient via the Internet.

The light diffuser lens 106 is physically mounted at the second distal end 118 of the flexible arm 120 as is clearly shown in FIGS. 2, 4, 7 and 8. The flexible arm 120 is a bendable or malleable extension that is capable of being manually manipulated so as to position the light diffuser lens 106 attached to the flexible arm 120 in a desired direction. This design enables the light diffuser lens 106 to be manually positioned over the computer web camera 102 notwithstanding whether the web camera 102 is integrated into the flat screen monitor 108 or is an aftermarket, stand-alone web camera mounted on the flat screen monitor 108. A proximal end 162 of the flexible arm 120 is then physically attached to the base clamping mechanism 122 as is clearly shown in FIGS. 6 and 8.

The universal lighting system 100 for use with a computer web camera 102 is employed for increasing the light level projected onto the computer subject (typically the computer operator) and for diffusing the light reflected from the illuminated subject and received by the computer web camera 102. The enhanced projected light level and the diffusion of the reflected light provide a better distribution of light rays that minimizes shadows and serves to enhance and clarify the image generated by the computer web camera 102 prior to being transmitted over the worldwide communication network. In operation, the base clamping mechanism 122 is fitted onto the top edge 124 of the flat screen monitor 108. The top edge 124 of the flat screen monitor 108 is positioned between the front lip 136 and the clamp structure 142 of the base clamping mechanism 122 ensuring that the rubber foot 144 and the felt pad 146 are in position to protect the rear and front sides of the flat screen monitor 108, respectively. Thereafter, the knurled handle of the adjustable clamp wheel 138 is turned in the appropriate direction to tighten the base clamping mechanism 122 onto the flat screen monitor 108. Thereafter, the telescopic arm 116 is adjusted in length and in its angular position as it relates to the tension swivel joint 148 so that the light array 110 is directed towards the computer subject. Next, the flexible arm 120 is manually adjusted so that the light diffuser lens 106 is positioned directly over the computer web camera 102. The light seal 160 is then pressed against the computer web camera 102 or the flat screen monitor 108 (depending upon the type of web camera being utilized) to block the admission of stray light. Next, the battery compartment access door 156 is opened to insure that charged batteries 158 have been installed. Finally, the spring-loaded light switch 154 is actuated to energize the light emitting diodes 112 for illuminating the computer subject. The computer operator can now utilize the computer web camera 102 to transmit the illuminated image over the worldwide communication network with confidence that the transmitted image will be free from distortion and shadows.

Thus, the universal lighting system 100 for use with the computer-web camera 102 includes a digital computing device 104 fitted with a computer web camera 102 for capturing images of a computer subject for transmission over a worldwide communication network. A base clamping mechanism 122 is affixed to the digital computing device 104. A light array 110 is adjustably connected to the base clamping mechanism 122 for illuminating the computer subject positioned before the web camera 102. A light diffuser lens 106 is flexibly connected to the base clamping mechanism 122 and sealingly positioned over the computer web camera 102 for diffusing received light for creating a clear image of the illuminated subject prior to transmission over the communication network.

The present invention provides novel advantages over other computer web camera systems known in the prior art. A main advantage of the universal lighting system 100 of the present invention for use with a computer web camera 102 is (1) the computer operator is illuminated, and (2) the light reflected to the computer web camera 102 from the illuminated subject enhances, clarifies and minimizes distortion of the image being generated prior to transmission across the worldwide communication network, (3) that the base clamping mechanism 122 is conveniently mounted and attached to the flat screen monitor 108, (4) that the light array 110 includes a plurality of high efficiency light emitting diodes 112 for providing an even distribution of light rays onto the computer subject for avoiding shadows, (5) that the extension length and angular position of the light array 110 can be adjusted (6) that the universal lighting system 100 is applicable to both laptop or desktop computers, (7) that a light seal 160 surrounds the light diffuser lens 106 for preventing the admission of stray light that would otherwise interfere with the operation of the light diffuser lens 106 and the computer web camera 102, and (8) that the flexible arm 120 is bendable and malleable so that the light diffuser lens 106 can be positioned directly over the computer web camera 102 notwithstanding its position, While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility. For example, it is within the scope of the present invention to provide a laptop type of digital computing device 104 fitted with an aftermarket, stand-alone computer web camera 102 or, in the alternative, a desktop type of digital computing device 104 fitted with an integral web camera 102. Both of these embodiments are foreseeable and are within the scope of the present invention.

It is therefore intended by the appended claims to cover any and all such modifications, applications and embodiments within the scope of the present invention. Accordingly,

What is claimed is:

1. A universal lighting system for use with a computer web camera comprising:
    a digital computing device fitted with a web camera for capturing images of a subject for transmission over a worldwide communications network;
    a base clamping mechanism affixed to said computing device;
    a light array adjustably connected to said base clamping mechanism for illuminating said subject positioned before said web camera; and
    a diffuser lens flexibly connected to said base clamping mechanism and sealingly positioned over said web camera for diffusing received light for creating a clear image of said illuminated subject prior to transmission over said communication network.

2. The universal lighting system of claim 1 wherein said web camera is integrated into a monitor screen of said digital computing device.

3. The universal lighting system of claim 1 wherein said web camera is mechanically attached to a monitor screen of said digital computing device.

4. The universal lighting system of claim 1 wherein said base clamping mechanism is affixed to a monitor screen of said digital computing device.

5. The universal lighting system of claim 1 wherein said base clamping mechanism includes a battery power supply for energizing said light array.

6. The universal lighting system of claim 1 wherein said base clamping mechanism includes a light switch for controlling electrical power to said light array.

7. The universal lighting system of claim 1 wherein said light array is comprised of a plurality of light emitting diodes.

8. The universal lighting system of claim 1 wherein said light array is adjustably connected to said base clamping mechanism by a telescopic arm.

9. The universal lighting system of claim 1 wherein said light array is adjustably connected to said base clamping mechanism by a swivel joint.

10. The universal lighting system of claim 1 wherein said diffuser lens is flexibly connected to said base clamping mechanism by a flexible arm.

11. A universal lighting system for use with a computer web camera comprising:
    a digital computing device fitted with a web camera for capturing images of a subject for transmission over a worldwide communications network;
    a base clamping mechanism affixed to said computing device, said clamping mechanism including an adjustable clamp wheel for adjusting the clamping pressure of said base clamping mechanism to a monitor screen of said computing device;
    a light array adjustably connected to said base clamping mechanism for illuminating said subject positioned before said web camera; and
    a diffuser lens flexibly connected to said base clamping mechanism and sealingly positioned over said web camera for diffusing received light for creating a clear image of said illuminated subject prior to transmission over said communication network.

12. The universal lighting system of claim 11 wherein said base clamping mechanism further includes a rubber foot for protecting the surface of said monitor screen of said computing device.

13. The universal lighting system of claim 11 wherein said base clamping mechanism further includes a felt pad for protecting the surface of said monitor screen of said computing device.

14. A universal lighting system for use with a computer web camera comprising:
    a digital computing device fitted with a web camera for capturing images of a subject for transmission over a worldwide communications network;
    a base clamping mechanism affixed to said computing device;
    a light array adjustably connected to said base clamping mechanism for illuminating said subject positioned before said web camera; and
    a diffuser lens flexibly connected to said base clamping mechanism and positioned over said web camera for diffusing received light for creating a clear image of said illuminated subject prior to transmission over said communication network, said diffuser lens including a light seal for blocking stray light from entering said web camera.

15. The universal lighting system of claim 14 wherein said light seal is comprised of rubberized neoprene.

* * * * *